United States Patent [19]
Leggett et al.

[11] Patent Number: 6,059,230
[45] Date of Patent: May 9, 2000

[54] EXPANDABLE AIRCRAFT DOOR

[75] Inventors: Douglas William Leggett, Los Angeles, Calif.; Kendall Gardner Young, Coppell, Tex.

[73] Assignee: Northrop Grumman Corporation, Los Angeles, Calif.

[21] Appl. No.: 09/075,099

[22] Filed: May 8, 1998

[51] Int. Cl.[7] .................................................... B64C 1/14
[52] U.S. Cl. .................................... 244/129.5; 244/129.4
[58] Field of Search ........................... 244/129.5, 129.4; 49/317, 315, 310, 505

[56] References Cited

U.S. PATENT DOCUMENTS

| | | |
|---|---|---|
| 3,718,171 | 2/1973 | Godwin . |
| 3,871,133 | 3/1975 | Ellingson . |
| 3,943,679 | 3/1976 | Dissinger . |
| 4,199,120 | 4/1980 | Bergman et al. ..................... 244/129.5 |
| 4,304,070 | 12/1981 | Musacchia ..................................... 49/2 |
| 4,375,876 | 3/1983 | Stewart . |
| 4,785,741 | 11/1988 | Gronow ................................... 105/348 |
| 4,805,345 | 2/1989 | Ohi . |
| 5,001,866 | 3/1991 | Powell et al. .............................. 49/477 |
| 5,305,969 | 4/1994 | Odell et al. ........................... 244/129.5 |
| 5,642,588 | 7/1997 | Sowers . |

*Primary Examiner*—Peter M. Poon
*Assistant Examiner*—Tran Dinh
*Attorney, Agent, or Firm*—Terry J. Anderson; Karl J. Hoch, Jr.

[57] ABSTRACT

A deformable aircraft door which is movable between open and closed positions and is adapted to substantially maintain contact with the door frame for reducing a perimeter gap between the door and the door frame. The aircraft door comprises an edge portion which is formed to engage the door frame, and an elastic portion which is attached to the edge portion. The elastic portion is selectively expandable and contractible for permitting movement of the edge portion relative to the door frame when the aircraft door is in the closed position so as to substantially maintain contact between the edge portion and the door frame despite changes in the geometry of the door frame.

18 Claims, 3 Drawing Sheets

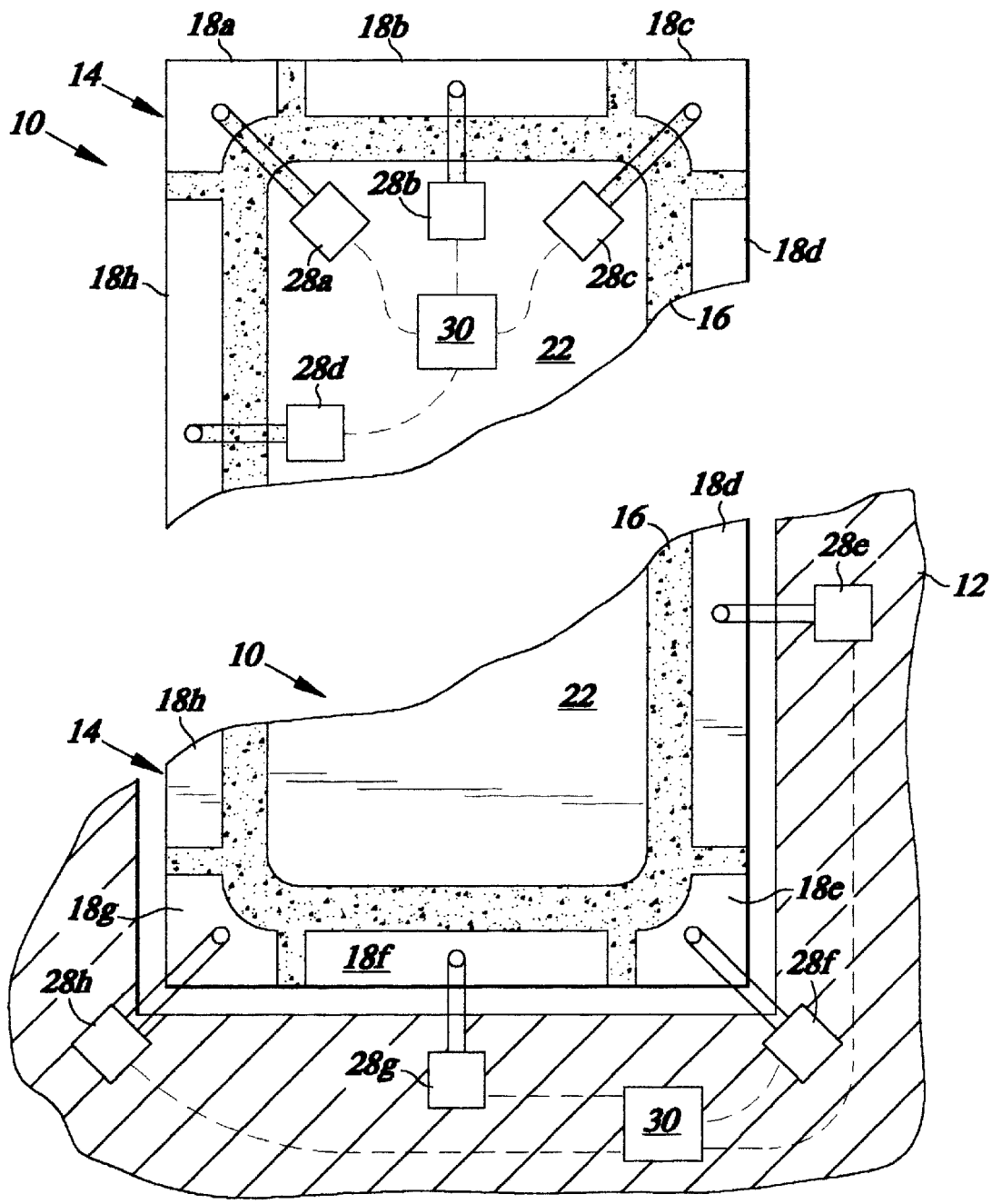

EXPANDABLE AIRCRAFT DOOR

FIELD OF THE INVENTION

The present invention relates generally to aircraft doors, and more particularly to a door which engages a door frame and expands and contracts to reduce a perimeter gap occurring between the door and the door frame.

BACKGROUND OF THE INVENTION

Aircraft employ a wide variety of doors which are exposed to the surrounding environment about the aircraft. Passenger ingress and egress doors and storage compartment doors permit access to the interior of the aircraft and are typically opened and closed while the aircraft is on the ground. In addition, there is a variety of flight actuated doors which are opened and closed during various times during aircraft flight. Common examples of flight actuated doors are weapons bay doors (in military aircraft), sensor suite doors, landing gear doors and auxiliary air doors.

Aircraft are subjected to various external and internal loads which may result in temporary deformations of the door frames which are located at various places about the aircraft. For example, it is typical for an aircraft to store fuel within its wings. Thus, when the aircraft is fueled the wings may tend to droop and the bottom side of the fuselage to be in a compressive state. When the aircraft is in flight, a variety of aerodynamic forces may act to upwardly push the wings and cause the bottom side of the fuselage to be in a relative tension state. Where there are doors located at regions of the aircraft which are locally subject to such forces (e.g., landing gear doors and weapons bay doors) the door frames thereof may deform, both in the plane of the door frame and out of the plane of the door frame.

Such deformations may result in the formation of gaps or discontinuities between the door and the door frame. As such, the reduction or mitigation of any gaps or discontinuities at or around the door frame is especially desirable which they tend to increase the radar signature of the aircraft.

In addition, it is often desirable that aircraft doors must be able to withstand pressure differentials between the interior and exterior of the door. Typically the interior pressure is greater than the external pressure (i.e., burst pressure). Such a pressure may be a function of the placement of the door upon the aircraft, altitude, and relative aircraft speed. A positive cabin pressure is typically maintained to provide for a hospitable environment. The door frame deformations, however, may result may result in poor or improper sealed engagement between the door and the door frame.

Though conventional aircraft doors are provided with seals about the perimeter of the door, such seals possess certain deficiencies which detract from their overall utility. In this respect, the prior art seals are typically designed to be highly flexible to allow for extreme deformations of the associated door frame. However, because of this high degree of flexibility, such seals are susceptible to poor sealing engagement with the door frame and are therefore inadequate to mitigate gaps and discontinuities when subjected to pressure differentials between the interior and exterior of the aircraft.

Accordingly, there is a need in the art for a aircraft door which is capable of substantially maintaining contact with a door frame which is susceptible to deformation in order to reduce or mitigate a perimeter gap occurring between the door and the door frame.

SUMMARY OF THE INVENTION

In accordance with the present invention, there is provided a deformable aircraft door which is movable between open and closed positions, and is adapted to reduce a perimeter gap between the door and a door frame which is formed in the fuselage of an aircraft which is susceptible to changes in geometry. It is contemplated that gaps, voids, or contour discontinuities occurring between the aircraft door and the door frame is especially undesirable because they tend to increase the radar signature and there for observability of the associated aircraft. As such the present invention functions to reduce or mitigate the radar signature of the associated aircraft.

The aircraft door comprises a door panel having an elastic portion which is attached to and extends about the peripheral edge thereof. Attached to the elastic portion is an edge portion which is formed to engage the door frame of the aircraft. The edge portion itself preferably comprises multiple edge segments, with the elastic portion preferably defining multiple transition regions, each of which is attached to and extends between a respective pair of the edge segments. As such, the edge segments do not extend in end-to-end fashion, but rather include a transition region attached to each end thereof. In the present aircraft door, the elastic portion is selectively expandable and contractible for permitting the independent movement of each of the edge segments relative to the door frame when the aircraft door is in the closed position so as to substantially maintain engagement between the edge portion and the door frame despite any changes in the geometry of the door frame. Thus, the movement of each of the edge segments relative to the door frame reduces or mitigates any perimeter gaps from occurring between the door and the door frame. In this respect, the expansion and contraction of the elastic portion results in the movement of each of the edge segments along a respective axis of motion. In one embodiment of the present invention, to selectively facilitate the movement of the edge segments along respective ones of the axes of motion alone or in combination, the aircraft door further comprises at least one, and preferably multiple actuator devices which are mechanically coupled to respective ones of the edge segments. These actuator devices may comprise hydraulic, pneumatic or electro-mechanical devices, and may be electrically connected to a control device which selectively controls the movement of the edge segments along respective ones of the axes of motion in response to sensed conditions regarding the geometry of the door frame.

The aircraft door of the present invention preferably comprises at least one guiding rod which extends between each of the edge segments and the door panel for guiding the movement of the edge segments along respective ones of the axes of motion. Each of these guiding rods may be attached to the door panel and extended through the elastic portion into slidable engagement with a respective one of the edge segments, or alternatively attached to a respective one of the edge segments and extended through the elastic portion into slidable engagement with the door panel. An additional feature of the guiding rods is that they structurally reinforce the transition section. In the preferred embodiment, at least one pair of guiding rods is extended between each of the edge segments and the door panel, with one of the guiding rods of the pair being attached to the edge segment and extended through the elastic portion into slidable engagement with the door panel, and the other guiding rod of the pair being attached to the door panel and extended through the elastic portion into slidable engagement with the edge segment. As will be recognized, the guiding rod(s) extended between the door panel and each edge segment extend in substantial parallel relation to the plane of motion of such edge segment.

In the preferred embodiment, the elastic portion is fabricated from a resilient material such as silicone or urethane, though similar alternative materials may also be employed in relation thereto. Additionally, the aircraft door may be sized so as to be of an area which is normally greater than the area of the opening defined by the door frame when in a relaxed state, thus necessitating that the elastic portion of the aircraft door be contracted or compressed by the actuator device(s) to facilitate the sealed engagement of the edge segments to the door frame. Alternatively, the aircraft door may be sized so as to be of an area which is normally less than the area of the opening defined by the door frame when in a relaxed state, thus necessitating that the elastic portion be expanded or stretched by the actuator device(s) to facilitate the engagement of the edge segments to the door frame. Such an embodiment would contemplate that the aircraft door be coupled and decoupled to the door frame via the actuator device(s) in order to facilitate opening and closing of the aircraft door.

Further in accordance with the present invention, there is provided a method of fabricating a deformable aircraft door which is movable between open and closed positions and adapted to substantially maintain contact with a door frame of an aircraft which is susceptible to changes in geometry. The method comprises the initial steps of providing an edge portion on the aircraft door which is sized and configured to engage the associated door frame, and attaching an elastic portion to the edge portion. The method further comprises the step of selectively expanding and contracting the elastic portion for permitting movement of the edge portion relative to the door frame when the aircraft door is in the closed position so as to substantially maintain contact between the edge portion and the door frame to compensate for changes in the geometry of the door frame. Thus, the formation of perimeter door gaps are mitigated. The step of attaching the elastic portion to the edge portion is itself preferably accomplished through the use of an open molding process.

Thus, the aircraft door constructed in accordance with the present invention is particularly suited to reduce a perimeter door gap between the door and the door frame of the aircraft subject to changes in geometry, i.e., deformation. Because the aircraft door, and in particular its edge portion, is adapted to selectively expand and contract, sufficient outward force may be applied thereby to the door frame as will effectively mitigate against perimeter door gaps and a loss of seal by substantially maintaining contact with the door frame. As such, the aircraft door constructed in accordance with the present invention represents a significant advancement in the art.

BRIEF DESCRIPTION OF THE DRAWINGS

These, as well as other features of the present invention, will become more apparent upon reference to the drawings wherein:

FIG. 5 is a partial cross-sectional view of a section of the aircraft door depicting the actuator devices associated therewith as arranged in accordance with a first embodiment of the present invention; and FIG. 6 is a partial cross-sectional view of a section of the aircraft door depicting the actuator devices associated therewith as arranged in accordance with a second embodiment of the present invention.

DETAILED DESCRIPTION OF THE PREFERRED EMBODIMENTS

Figure 1:
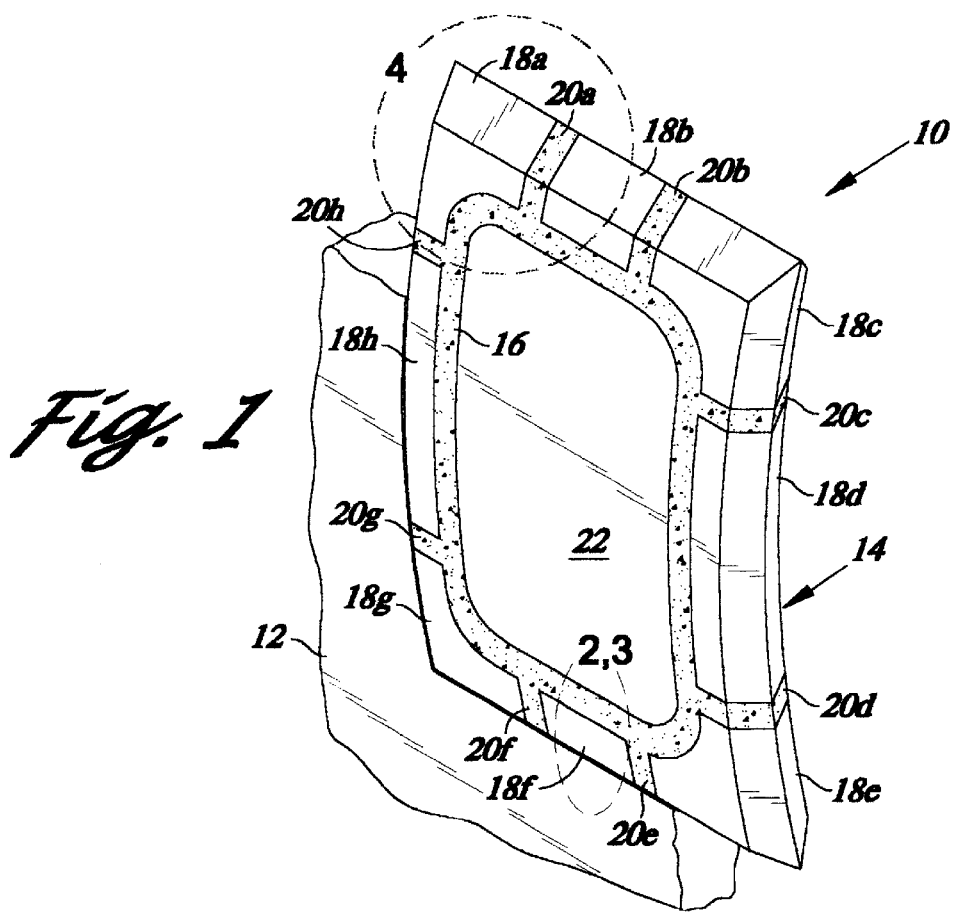
FIG. 1 is a perspective view of the aircraft door of the present invention depicted in relation to a portion of an aircraft door frame.

Referring now to the drawings wherein the showings are for purposes of illustrating preferred embodiments of the present invention only, and not for purposes of limiting the same, FIGS. 1–6 illustrate a deformable aircraft door 10 constructed in accordance with the present invention. As will be described in more detail below, the aircraft door 10 is specifically adapted to substantially maintain contact with a door frame 12 formed in the fuselage of an aircraft despite any changes in the geometry of such door frame 12. It is contemplated that gaps, voids, or contour discontinuities occurring between the aircraft door 10 and the door frame 12 is especially undesirable because they tend to increase the radar signature and there for observability of the associated aircraft. As such the present invention functions to reduce or mitigate the radar signature of the associated aircraft.

Figure 2:
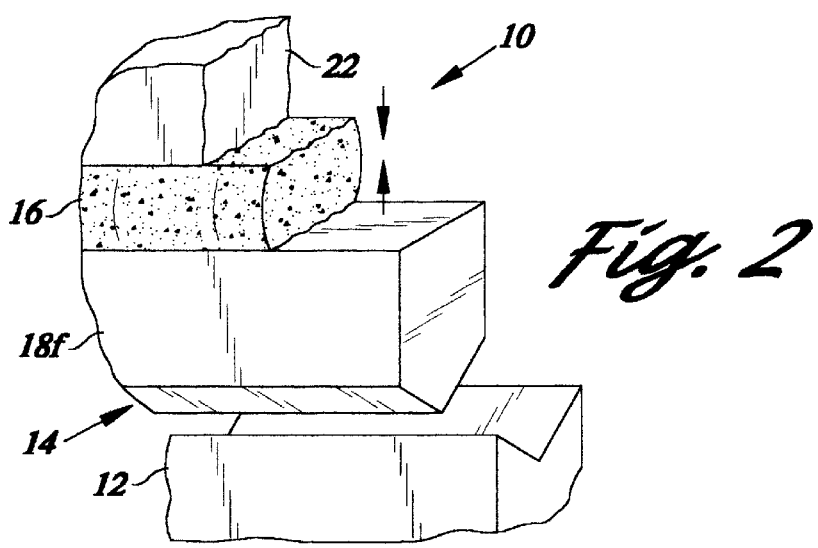
FIG. 2 is an exploded view of a section of the aircraft door illustrated in FIG. 1, depicting an elastic portion of the door in a contracted state.
Figure 3:
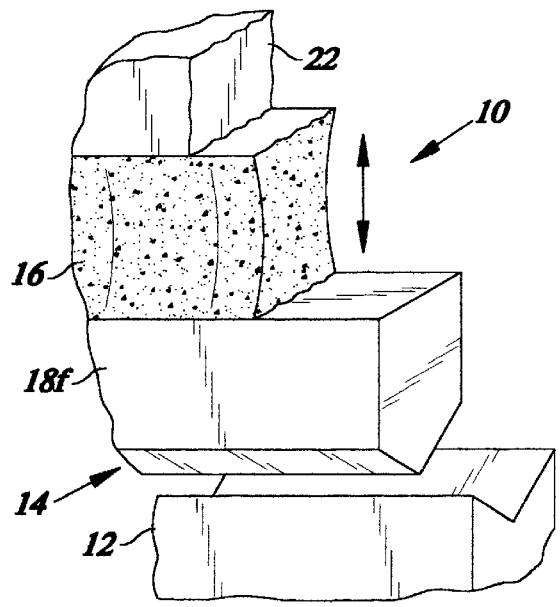
FIG. 3 is an exploded view similar to FIG. 2, depicting the elastic portion of the door in an expanded state.

Referring now to FIGS. 1–3, the aircraft door 10 comprises a generally rectangular door panel 22 which is provided with a generally arcuate contour. Attached to and extending about the peripheral edge of the door panel 22 is an elastic portion 16 of the aircraft door 10. Attached to the peripheral edge of the elastic portion 16 itself is an edge portion 14 of the aircraft door 10 which is formed to engage the door frame 12 of the aircraft. The edge portion 14 is not a continuous member, but rather preferably comprises multiple edge segments 18. For illustrative purposes only, the aircraft door 10 is shown as having eight (8) individual edge segments (denoted as 18a–h). In this respect, four (4) of the edge segments 18 (i.e., the edge segments 18a, 18c, 18e, 18g) are disposed adjacent respective ones of the four (4) corner regions defined by the elastic portion 16, with two of the edge segments 18 (i.e., the edge segments 18d, 18h) extending along respective ones of the longitudinal sides of the elastic portion 16, and the remaining two edge segments 18 (i.e., the edge segments 18b, 18f) extending along respective ones of the lateral sides of the elastic portion 16. Those of ordinary skill in the art will recognize that greater or fewer than eight (8) edge segments 18 may be included in the edge portion 14.

In the aircraft door 10, the elastic portion 16 is formed to include multiple transition regions 20 (individually denoted as 20a–h), pairs of which extend from respective ones of the longitudinal and lateral sides of the elastic portion 16. As best seen in FIG. 1, each of the transition regions 20 is attached to and extends between a respective pair of the edge segments 18. As such, the edge segments 18 do not extend in end-to-end fashion, but rather include a transition region 20 attached to each end thereof. In the preferred embodiment, the edge portion 14 is collectively defined by both the edge segments 18 and transition regions 20 of the elastic portion 16 extending therebetween. However, those of ordinary skill in the art will recognize that the elastic portion 16 need not be provided with the transition regions 20, and that the edge portion 14 may comprise only the edge segments 18, the opposed ends of which are slidably attached to each other. As will be discussed in more detail below, the transition regions 20 are preferably included in the edge portion 14 for purposes of preventing any abrupt changes in the geometry thereof.

In the aircraft door 10, the outer edge of each edge segment 18 and each transition region 20 has a generally V-shaped configuration. The transition regions 20 are sized relative to the edge segments 18 such that the V-shaped outer edges thereof are substantially flush with the outer edges of the edge segments 18. As such, the edge portion 14 collectively defined by the edge segments 18 and transition regions 20 itself defines a peripheral, V-shaped contact surface, a portion of which is shown in FIG. 2. This V-shaped contact surface defined by the edge portion 14 is adapted to sealably engage the door frame 12. In this respect, formed within the door frame 12 is a V-shaped slot having a configuration complementary to that of the contact surface of the edge portion 14. As will be recognized, the receipt of the contact surface of the edge portion 14 into the slot of the door frame 12 is adapted to create a seal between the aircraft door 10 and the door frame 12, and hence the aircraft fuselage.

Those of ordinary skill in the art will recognize that though the contact surface of the edge portion 14 and slot within the door frame 12 are formed to have complementary V-shaped configurations, alternative configurations may be employed in relation thereto. In addition, although the aircraft door 10 and door frame 12 are depicted in FIGS. 1–6 as being generally rectangular, it is contemplated that the present invention may be practiced with any number of door/door frame geometry configurations.

In the aircraft door 10, the elastic portion 16 is selectively expandable and contractible for permitting the independent movement of each of the edge segments 18 relative to the door frame 12 when the aircraft door 10 is in a closed position upon the fuselage of the aircraft. Such selective expansion and contraction of the elastic portion 16 is operable to substantially maintain contact between the edge portion 14 and the door frame 12 despite any changes in the geometry of the door frame 12. Thus, perimeter door gaps or abrupt contour discontinuities can be mitigated or otherwise reduced. The expansion and contraction of the elastic portion 16 results in the movement of each of the edge segments 18 along a respective axis of motion. As will be recognized, the elastic portion 16 is necessarily fabricated from a flexible material, and is preferably formed from an elastomeric material, such as silicone or urethane, though similar alternative materials may also be employed in relation thereto. Additionally, it is contemplated, though not required, that the edge segments 18 will be formed of a material which is substantially more rigid than that used to form the elastic portion 16.

Referring now to FIGS. 5 and 6, to selectively facilitate the movement of the edge segments 18 along respective ones of the axes of motion alone or in combination, the aircraft door 10 of the present invention further comprises at least one, and preferably multiple actuator devices 28 which are mechanically coupled to respective ones of the edge segments 18. In accordance with a first embodiment of the present invention (shown in FIG. 5), the actuator devices 28 (denoted as 28a–d) are attached to the door panel 22, while in accordance with a second embodiment of the present invention (shown in FIG. 6), the actuator devices 28 (denoted as 28e–h) are attached to the aircraft fuselage in relative close proximity to the door frame 12 formed therewithin. The actuator devices 28 may comprise hydraulic devices, pneumatic devices (e.g., piston/cylinder arrangements connected to a pressurized fluid source), electromechanical devices (e.g., electrical motors), and the like, and are preferably connected to a control device 30 which selectively controls the movement of the edge segments 18 along respective ones of the axes of motion in response to sensed conditions regarding the geometry of the door frame 12. The mechanical connection of each actuator device 28 to a respective edge segment 18 is preferably accomplished using any number of arrangements chosen from those well known to one of ordinary skill in the art, and may include, by way of example, rods, linkages, cammed members, chains, and cables.

In the present aircraft door 10, the control device 30 is adapted to actuate the actuator devices 28 individually or in any combination, thus allowing for the movement of the edge segments 18 individually or in any desired combination, including the simultaneous movement of all of the edge segments 18. As indicated above, the movement of the edge segment(s) 18 by the control device 30 via the actuator device(s) 28 occurs in response to sensed conditions regarding the geometry of the door frame 12, as well as the aircraft door 10 itself. Such sensed conditions may include the aircraft door 10 being opened/closed, and the deformation of the door frame 12. The control device 30, as well as the mechanical members used to facilitate the coupling of the actuator devices 28 to the edge segments 18, are further adapted to allow for the manual initiation of the movement of the edge segments 18 relative to the door frame 12.

Figure 4:
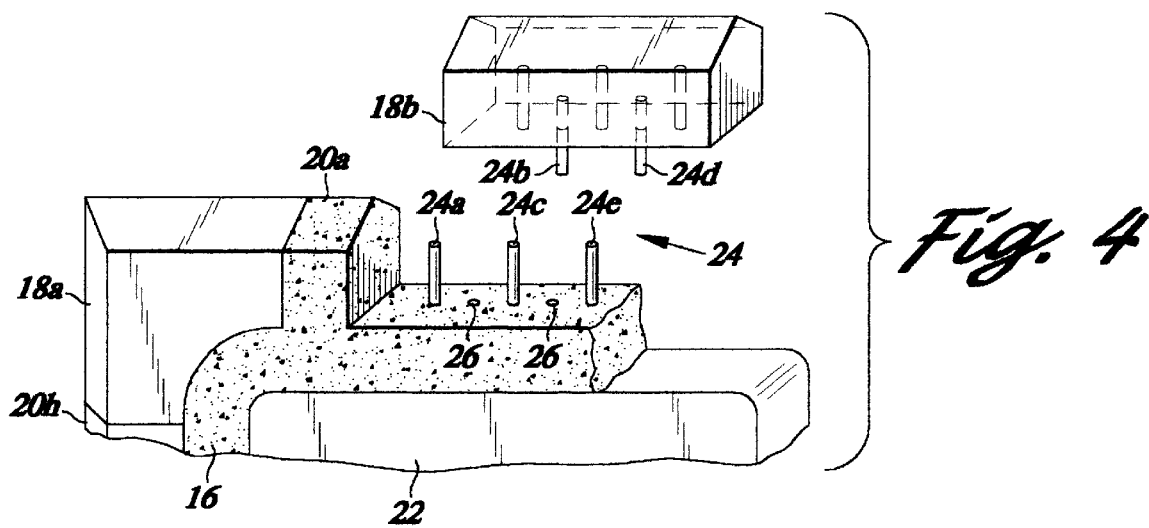
FIG. 4 is an exploded view of a section of the aircraft door illustrated in FIG. 1.

Referring now to FIG. 4, the aircraft door 10 of the present invention further preferably comprises multiple guiding rods 24 which extend between each of the edge segments 18 and the door panel 22 for guiding the movement of the edge segments 18 along respective ones of the axes of motion. More particularly, the guiding rods 24 faciliate guiding within a plane as defined by the axes of motion of the edge segments 18. In such embodiment of the present invention, of the guiding rods 24 extending between each edge segment 18 and the door panel 22, certain ones of such guiding rods are rigidly attached to the edge segment 18 and slidably engaged to the door panel 22, with others of the guiding rods 24 being rigidly attached to the door panel 22 and slidably engaged to the edge segment 18. By way of example, as shown in FIG. 4, the edge segment 18b includes two (2) guiding rods 24b, 24d which are rigidly attached thereto and extend therefrom. The guiding rods 24b, 24d are advanced through respective ones of a pair of apertures 26 formed in the elastic portion 16, and are slidably engaged to the door panel 22. Rigidly attached to and extending from the elastic portion 16 are three (3) guiding rods 24a, 24c, 24e which are slidably engaged to the edge segment 18b via the receipt thereof into respective ones of three (3) complementary openings formed in the side of the edge segment 18b opposite that having the generally V-shaped configuration. As will be recognized, the guiding rod(s) 24 extending between the door panel 22 and each edge segment 18 extend in substantially parallel relation to the axis of motion of such edge segment 18. Additionally, those of ordinary skill in the art will recognize that any number of guiding rods 24 may be extended between each edge segment 18 and the door panel 22, and that all such guiding rods 24 may be rigidly attached to the panel 22 or rigidly attached to the edge segment 18. Furthermore, one of ordinary skill in the art will recognize that the guiding rods 24 are not required to be disposed internal to the transition region 20 as depicted. Moreover, the guiding rods 24 may take the form of other structural shapes having a variety of cross sectional geometries, such as bars, slats, links, etc.

As will be recognized, due to the attachment of the edge segments 18 to the elastic portion 16 (including the transition regions 20 thereof), the outward movement of the edge segments 18 caused by the actuator devices 28 will result in the expansion or stretching of the elastic portion 16, including its transition regions 20. Conversely, the inward movement of the edge segments 18 by the actuator devices 28 will result in the contraction or compression of the elastic portion 16 and its transition regions 20. FIG. 2 depicts the elastic portion 16 in such contracted or compressed state, with FIG. 3 depicting the elastic portion 16 in its expanded or stretched state. As such, the edge portion 14 collectively defined by the edge segments 18 and transition regions 20 may be moved inwardly or outwardly relative to the door frame 12 by the expansion and contraction of the elastic portion 16 which may be controlled by the actuator devices 28 and control device 30.

In anther embodiment of the present invention, the aircraft door 10 may be sized so as to be of an area which is normally greater than the area of the opening defined by the door frame 12. As such it is contemplated that the elastic portion 16 of the aircraft door 10 must contracted or compressed to facilitate the sealed engagement of the edge portion 14 to the door frame 12. This contraction or compression may be facilitated by the actuator devices 28 or some other mechanical application. Thus, advantageously upon closure of the aircraft door 10 the transition region 20 would experience a pre-loaded state which could readily expand to compensate for anticipated door frame deformations. As one of ordinary skill in the are will recognize, by having a pre-loaded elastic portion 16 it may not be necessary to utilize the actuator devices 28 to maintain sealed contact of the aircraft door 10 and the door frame 12. Such an arrangement is especially desirable as it is passive in nature and would not require any complicated in-flight actuation. Alternatively, the aircraft door 10 may be sized so as to be of an area which is normally less than the area of the opening defined by the door frame 12, thus necessitating that the elastic portion 16 be expanded or stretched to facilitate the sealed engagement of the edge portion 14 to the door frame 12. Such stretching may be facilitated by the actuator devices 28 and may require that the aircraft door 10 be coupled and decoupled to the aircraft door frame 12 via the actuator devices 28 in order to be opened and closed. Whether the elastic portion is contracted or expanded to facilitate the engagement between the edge portion 14 and the door frame 12, it is contemplated that sufficient outward force will be exerted by the edge portion 14 against the door frame 12 as will compensate for any deformation of the door frame 12 or aircraft door 10 itself within an expected range. Thus, as the door frame 12 deforms, the force exerted by the edge portion 14 thereagainst mitigates against the formation of any gaps therebetween.

It is contemplated that the aircraft door 10 of the present invention may be fabricated by placing the edge segments 18 and door panel 22 into a mold, and injection or open molding the elastic portion 16 therebetween, thus facilitating the firm engagement between the elastic portion 16 and the edge segments 18 and door panel 22. Those surfaces of the edge segments 18 and door panel 22 which are in direct contact with the elastic portion 16 may be primed or coated with appropriate materials to enhance the adhesion of the elastic portion 16 thereto. Any suitable elastomeric material in a liquid state may be injected or open poured into the mold between the edge segments 18 and door panel 22. As will be recognized, the hardening of such elastomeric material completes the formation of the elastic portion 16. Additionally, in the preferred formation process, the guiding rods 24 will be extended between the door panel 22 and edge segments 18 prior to the molding of the elastic portion 16 therebetween. In this respect, the guiding rods 24 will preferably be coated with a release agent which inhibits the adhesion of the elastomeric material used to form the elastic portion 16 thereto.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A deformable aircraft door movable between open and closed positions and adapted to substantially maintain contact with a door frame for reducing a perimeter gap between the door and the door frame, the aircraft door comprising:

an edge portion formed to engage the door frame; and an elastic portion attached to the edge portion, the elastic portion being selectively expandable and contractible for permitting movement of the edge portion relative to the door frame when the aircraft door is in the closed position so as to substantially maintain contact between the edge portion and the door frame despite changes in the geometry of the door frame.

2. The aircraft door of claim 1 wherein the elastic portion is fabricated from an elastomeric material.

3. The aircraft door of claim 2 wherein the elastomeric material is silicon.

4. The aircraft door of claim 1 wherein the door frame defines an opening which is of a first area and the aircraft door is sized so as to be of a second area which is normally less than the first area.

5. The aircraft door of claim 1 wherein the door frame defines an opening which is of a first area and the aircraft door is sized so as to be of a second area which is normally greater than the first area.

6. The aircraft door of claim 1 wherein the edge portion comprises multiple edge segments.

7. The aircraft door of claim 6 wherein the elastic portion defines multiple transition regions, each of said transition regions being attached to and extending between a respective pair of the edge segments.

8. The aircraft door of claim 6 further comprising a door panel attached to the elastic portion.

9. The aircraft door of claim 8 wherein the expansion and contraction of the elastic portion results in the movement of each of the edge segments along a respective axis of motion, and said aircraft door further comprises at least one actuator device mechanically coupled to the edge segments for selectively facilitating the movement thereof along respective ones of the axes of motion.

10. The aircraft door of claim 9 further comprising at least one guiding rod extending between each of the edge segments and the door panel for guiding the movement of the edge segments along respective ones of the axes of motion.

11. The aircraft door of claim 10 wherein each of the guiding rods is attached to the door panel and is extended through the elastic portion into slidable engagement with a respective one of the edge segments.

12. The aircraft door of claim 10 wherein each of the guiding rods is attached to a respective one of the edge segments and is extended through the elastic portion into slidable engagement with the door panel.

13. The aircraft door of claim 10 further comprising multiple guiding rods extending between each of the edge segments and the door panel.

14. The aircraft door of claim 13 wherein at least one pair of guiding rods is extended between each of the edge segments and the door panel, with one of the guiding rods of the pair being attached to the edge segment and extended through the elastic portion into slidable engagement with the door panel, and the other guiding rod of the pair being attached to the door panel and extended through the elastic portion into slidable engagement with the edge segment.

15. The aircraft door of claim 9 wherein said at least one actuator device comprises multiple actuator devices mechanically coupled to respective ones of the edge segments.

16. The aircraft door of claim 9 further comprising a control device electrically connected to the actuator device for selectively controlling the movement of the edge segments along respective ones of the axes of motion in response to sensed conditions related to the geometry of the door frame.

17. A method of making a deformable aircraft door movable between open and closed positions and adapted to substantially maintain contact with a door frame for reducing a perimeter gap between the door and the door frame, the method comprising the steps of:

(a) providing an edge portion on the aircraft door which is sized and configured to engage the door frame;

(b) attaching an elastic portion to the edge portion; and (c) selectively expanding and contracting the elastic portion to facilitate the movement of the edge portion relative to the door frame when the aircraft door is in the closed position so as to substantially maintain contact between the edge portion and the door frame to compensate for changes in the geometry of the door frame.

18. The method of claim 17 wherein step (b) comprises forming the elastic portion via an open molding process.

* * * * *